C. W. ANDERSON.
PULLEY.
APPLICATION FILED NOV. 13, 1913.

1,151,748.

Patented Aug. 31, 1915.
2 SHEETS—SHEET 1.

Witnesses
Arthur O. Morse
H. A. Sandberg

Inventor
Carl W. Anderson
By J. Arthur Baldwin
Attorney

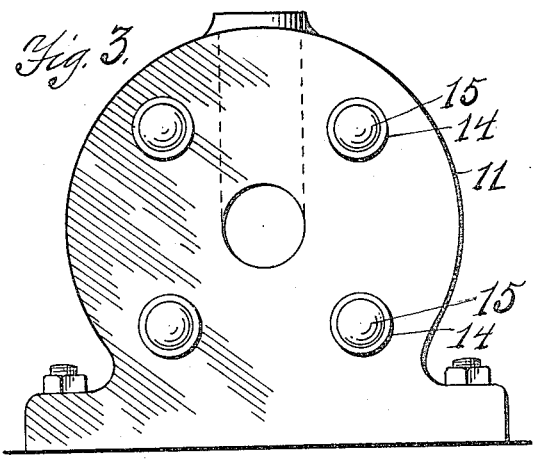
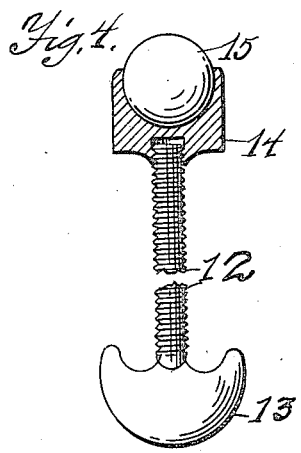
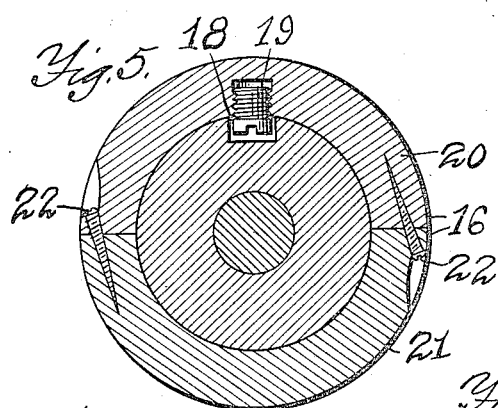
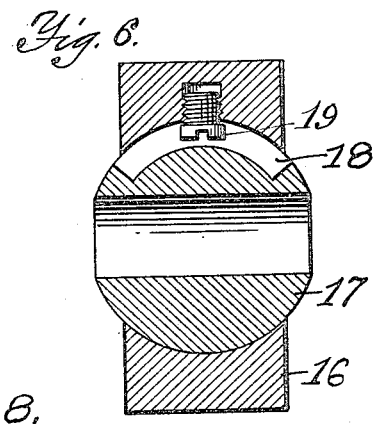
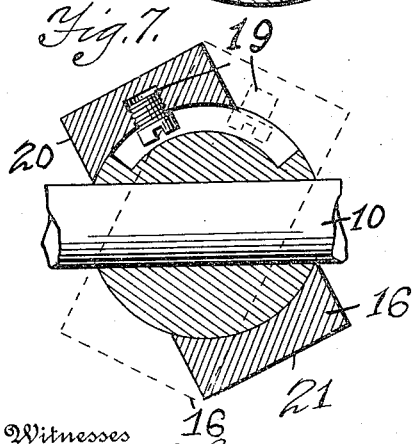
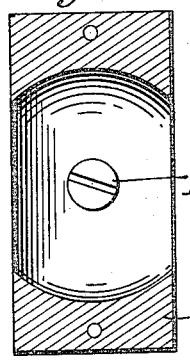
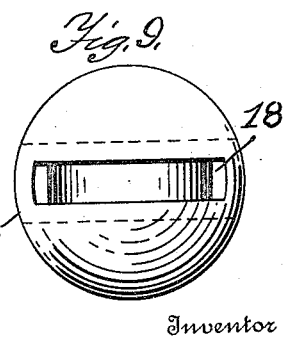

UNITED STATES PATENT OFFICE.

CARL W. ANDERSON, OF JAMESTOWN, NEW YORK.

PULLEY.

1,151,748. Specification of Letters Patent. Patented Aug. 31, 1915.

Application filed November 13, 1913. Serial No. 800,699.

*To all whom it may concern:*

Be it known that I, CARL W. ANDERSON, a citizen of the United States, residing at the city of Jamestown, in the county of Chautauqua and State of New York, have invented certain new and useful Improvements in Pulleys, of which the following, taken in connection with the accompanying drawings, is a specification.

The invention relates to adjustable pulleys, and the object of the improvement is first to provide a pulley, the belt receiving surface of which may be adjusted to different planes in relation to the shaft; and second, to provide guides for adjusting the pulley and keeping it in the adjusted position; and the invention consists in the novel features and combinations hereinafter set forth and claimed.

Figure 1:
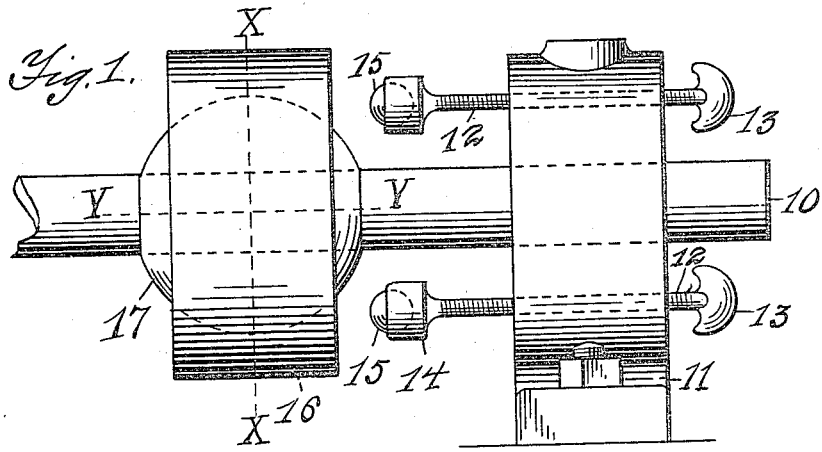
Figure 2:
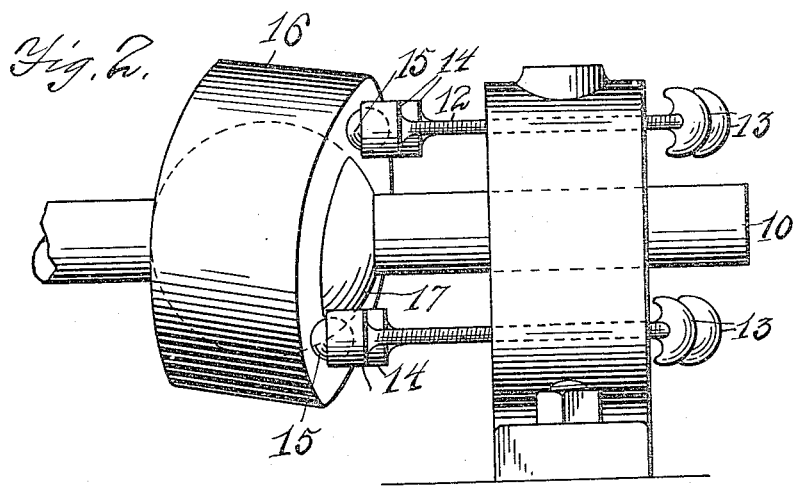

In the drawings: Figure 1 is an elevation of the pulley and hanger with the guides extending therethrough but out of contact with the pulley; and Fig. 2 is a similar view with the pulley in contact with the guides and guided thereby out of line with the shaft. Fig. 3 is a elevation of one of the hangers with the guides for the pulley therein. Fig. 4 is a detail of one of the guide screws with the end in section, showing the ball cup with the ball therein on the end of the screw. Fig. 5 is a sectional view of the pulley at line X—X in Fig. 1; and Fig. 6 is a central sectional view perpendicular to plane Y—Y in Fig. 1, showing the ball-shaped central portion with the bisected rim fitting over the same and the key and slot for uniting the rim to the central portion of the pulley; and Fig. 7 is a sectional view similar to that shown in Fig. 6, showing the rim portion of the pulley at different angles in solid and dotted lines. Fig. 8 is a plan view of the interior of one of the halves of the pulley rim showing the key screw. Fig. 9 is an elevation of the ball-shaped central portion of the pulley, showing the key slot therein.

Like numerals of reference refer to corresponding parts in the several views.

The numeral 10 designates the shaft and the numeral 11 the hanger, which may be made in any suitable shape so that it has sufficient size around shaft 10 to receive therethrough a plurality of guide screws 12.

The guide screws 12 are preferably provided with flanged ends 13 for manually turning the same at one end and a ball and socket part 14 at the other end, the screw threaded ends of the screw being turned into the socket part 14. The ball 15 is held by the socket so as to form the end of the screw 12 and turn freely therein as it bears against the side of the pulley rim 16, and all the screws 12 are adjusted so as to guide the pulley rim 16 in the desired plane in its relation to the shaft 10 or the machine.

The pulley consists of the rim 16 which is mounted on the central ball-shaped portion 17 so as to turn at any desired angle thereon, the inner surface of the rim 16 fitting perfectly over the ball 17. The ball 17 is fixedly attached on the shaft 10 and has a slot 18 extending around a portion of its periphery to receive therein the key screw 19 which extends out from the inner side of a portion of the rim 16. The rim 16 is preferably made in two parts 20 and 21 which are attached to one another by means of suitable screws 22. It is apparent that these parts may be turned out of wood and fitted together to form the pulley and keyed in place on the shaft 10, and that the rim 16 may be turned at any desired angle in relation to the shaft 10, thus doing away with the necessity of setting machines absolutely parallel to the shaft. There are many places in which this is almost impossible and the adjustable rim 16 overcomes the need of such parallel placing. To make the parts 16 and 17 of metal and place a metal rim around said parts would not depart from my invention.

The hanger 11 may act as a support for the guide screws 12 and also for a hanger for the shaft 10, or only as a support for the guide screws 12. In the latter case the hanger 11 is preferably slotted as shown in dotted line in Fig. 3, so that the hanger 11 may easily slip onto the shaft 10 along side the pulley 16 and attached to a support, the same as the other hanger for the shaft 10. It is usually preferable, however, to use the hanger 11 both as a support for the shaft and for the guide screws 12.

I claim as new—

1. A pulley comprising a central portion, a rim on said central portion universally adjustable, and independently adjustable guiding means along side said pulley to guide said rim in different planes.

2. A pulley comprising a central portion, a rim on said central portion universally adjustable, a plurality of independently adjustable guides to guide said rim in the desired plane, and a suitable support for said guides.

3. A pulley comprising a central portion, a rim on said central portion universally adjustable, a hanger adjacent the side of said pulley, and a plurality of independently adjustable guide screws in said hanger to bear against said rim and guide it in the desired plane.

4. A pulley comprising a central portion, a rim on said central portion universally adjustable, a guide support adjacent the side of said pulley, a plurality of screws independently adjustable in said support to adjustably bear against the side of said pulley rim, and ball bearings in the ends of said screws.

5. A pulley comprising a central ball-shaped portion having an opening therethrough to receive the shaft and having a peripheral slot in line with said shaft, a bisected rim portion to fit said ball-shaped portion, a key in said rim portion extending into said slot to permit the sidewise movement of said rim while holding the rim and central portion in unison, a support along side said pulley, and a plurality of independently adjustable guide screws in line with said rim to bear against the same and guide it in different planes, substantially as and for the purpose specified.

6. The combination with a hanger, a shaft rotatably supported by the hanger, a rounded portion on the shaft, said rounded portion having a groove formed therein, a sectional rim encircling the said portion, a screw removably engaged with one of the rim sections and adapted to slidably engage in said groove, a plurality of screws passed through the hanger and in parallel relation to the shaft, the inner ends of which screws are provided with socketed heads, balls mounted against one side of the rim, and hand grips in the sockets of the heads for bearing on the outer ends of the screws, manually operable to adjust the screws independently so that the balls supported thereby may be caused to guide the rim in different planes.

In testimony whereof I have affixed my signature in the presence of two witnesses.

CARL W. ANDERSON.

Witnesses:
ARTHUR O. MORSE,
H. A. SANDBERG.

Copies of this patent may be obtained for five cents each, by addressing the "Commissioner of Patents, Washington, D. C."